INVENTORS
LAYTON D. MORGAN
ROBERT J. VACHON

United States Patent Office 3,403,247
Patented Sept. 24, 1968

3,403,247
ANALOG BEAM PATTERN DIGITAL SIMULATOR
Layton D. Morgan and Robert J. Vachon, San Diego, Calif., assignors to the United States of America as represented by the Secretary of the Navy
Filed Jan. 29, 1964, Ser. No. 341,151
2 Claims. (Cl. 235—184)

ABSTRACT OF THE DISCLOSURE

A system for simulating the reception of acoustic wavefronts, having variable azimuths, by an array of transducers. The simulated wavefronts are utilized in testing the response characteristics of tapped delay lines used, in the transducer array, for phase compensation. The simulation is achieved by using a shift register having a bit capacity equal to the number of taps on the delay line to be tested and providing the shift register with a variable source of clock signals. The register outputs, depending on the clock frequency, simulate plane wavefronts of particular azimuth since they change in phase as the shifting in the register occurs.

---

The invention described herein may be manufactured and used by or for the Government of the United States of America for governmental purposes without the payment of any royalties thereon or therefor.

The present invention relates to an analog beam pattern digital simulator and more particularly to an analog beam pattern digital simulator for use in the testing of delay line phasing components.

In many beam pattern arrays, such as those utilized for sonar and radar purposes, bearing information is received through the use of delay line techniques which, in effect, are receptive to signals approaching the hydrophone array from a predetermined angle. The signals then induce out of phase signals in the hydrophones in a particular phase relationship, and are combined by delaying each signal in a delay line a predetermined amount for optimum addition of signal strength at the delay line output. It can be seen it is necessary to have a separate delay line component for each bearing or sector of interest, and each delay line component will have a delay depending upon the relative phase displacement in the hydrophone array resulting from a sound wave impinging at that particular azimuth.

In the design of the delay lines, it is necessary that not only the correct amount of delay is present in each segment thereof, but also that the delay lines have proper impedance and other parameters for optimum reception. For this reason, it has been necessary to devise a method of testing delay lines for optimum response at the desired azimuths.

According to the invention, an analog beam pattern digital simulator is provided which has a plurality of outputs adapted for connection to a delay line under test and signals from various azimuths are simulated for testing delay line performance. A digital shift register is provided having a signal generator at its input at the same frequency at which the equipment being associated with the delay line operates. This signal generator will fill the digital shift register at a rate depending upon the shift frequency applied to the shift input of the digital shift register. This rate is made variable and hence becomes a simulation of varying azimuths of an impinging sound wave. A continuous output is taken from each stage of the shift register to an incremental time delay tap on the delay line being tested. It can be seen that if the shift frequency is infinite all of the taps would have the same signal simultaneously as an input to the delay line which would simulate a wave impinging upon each element of a hydrophone array simultaneously or at zero azimuth. As the shift frequency is reduced the simulation will be that of a sound wave impinging upon the hydrophones at a more normal angle until finally the sound wave is at 90° or 270° azimuth. An output can be taken at one end of the delay line being tested and a recording made for minor lobe suppression, for example, and also to indicate a peak. The shift frequency generator can then have a frequency indicator attached thereto (which can be calibrated directly in azimuths) which will correlate the peaks with the simulated azimuths.

An object of the present invention is the provision of an analog beam pattern digital simulator which can be utilized for testing the performance of delay line compensators.

Another object is to provide an analog beam pattern digital simulator which is extremely versatile.

A further object of the invention is the provision of an analog beam pattern digital simulator in which only conventional components are utilized.

Still another object is to provide an analog beam pattern simulator which is simple, inexpensive and requires a minimum of maintenance and adjustment.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
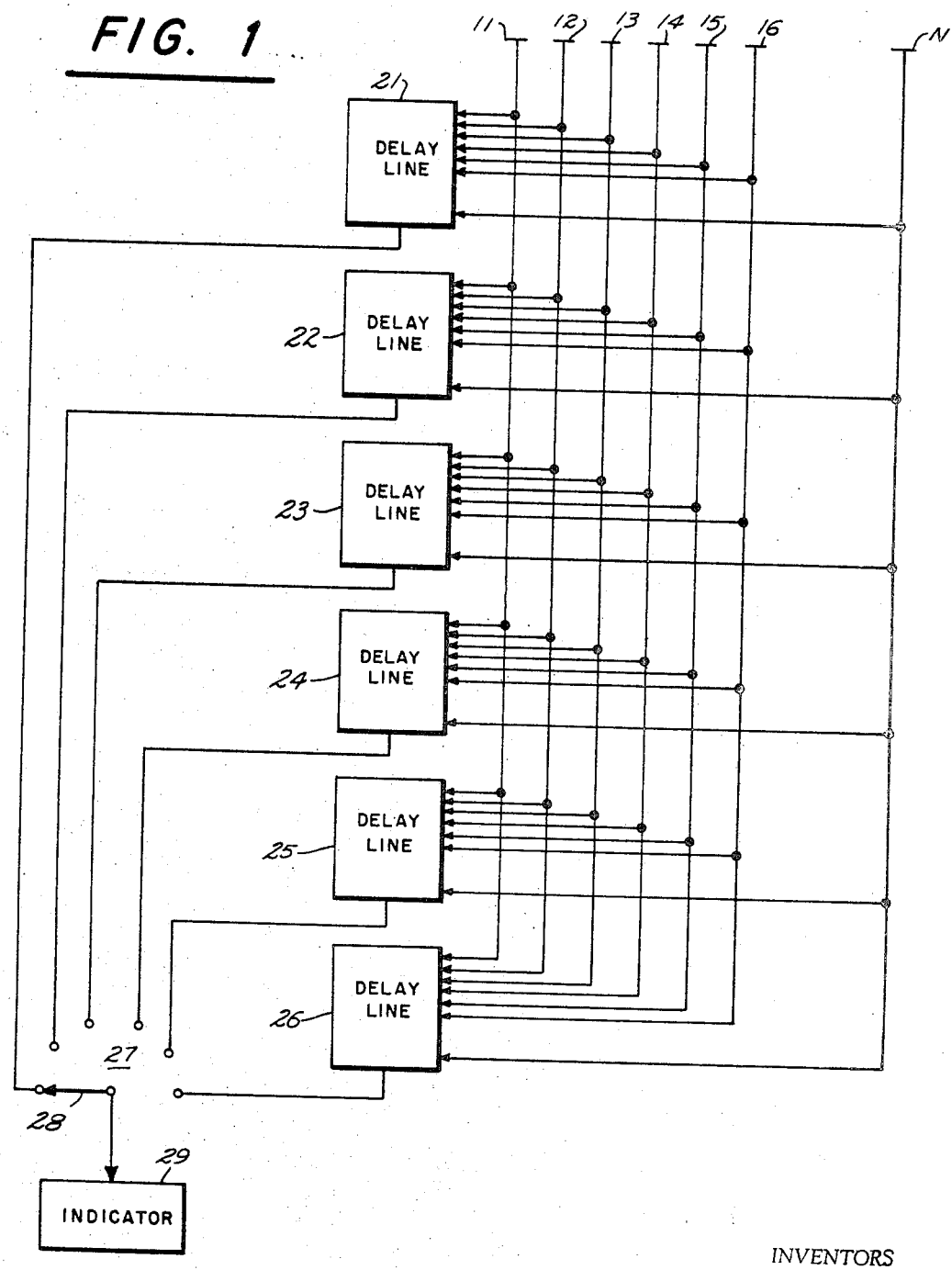
FIG. 1 shows a typical system utilizing the delay lines for phase displacement compensation.

Referring to FIG. 1, an array of hydrophones is shown comprising hydrophones 11, 12, 13, 14, 15, 16 and N. Each hydrophone is connected to one input of incremental delay lines 21, 22, 23, 24, 25 and 26. The output of each delay line is connected to a different contact of switch 27. Switch arm 28 of switch 27 is connected to an input of indicator 29.

Figure 2:
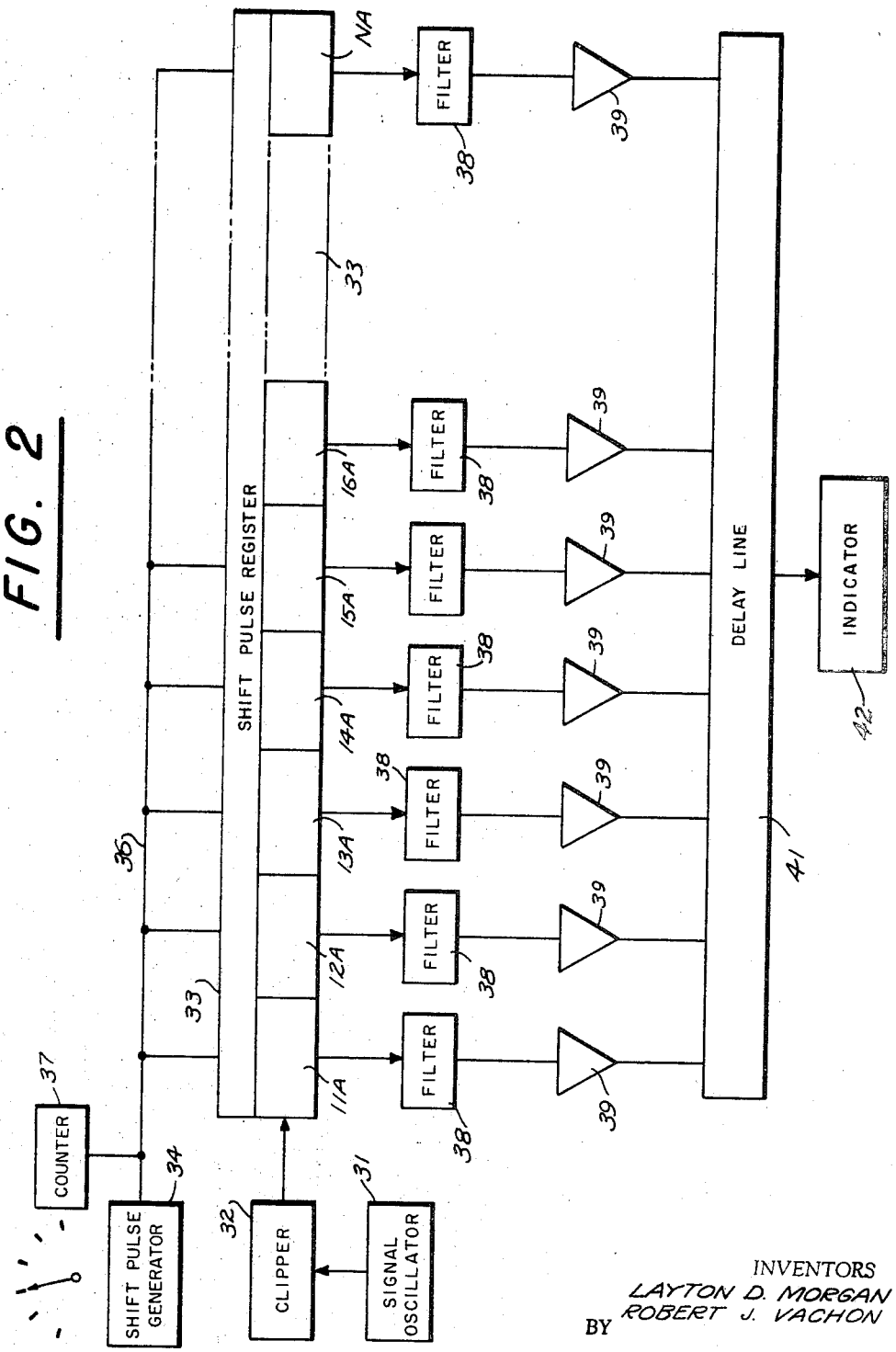
FIG. 2 shows a preferred embodiment of the present invention in block diagram form.

According to FIG. 2 signal oscillator 31 has an output connected through clipper 32 to the input stage 11A of shift pulse register 33. Shift pulse register 33 has stages 11A, 12A, 13A, 14A, 15A, 16A, to NA corresponding to the hydrophones 11, 12, 13, 14, 15, 16 and N of FIG. 1. Shift pulse generator 34 has an output which is connected to shift pulse line 36 of the shift pulse register 33. Counter 37 counts the frequency of shift pulse generator 34. Each stage of shift pulse register 33 has an output connected through a separate one of filters 38 and amplifiers 39 to a separate input tap of delay line 41. Delay line 41 has an output connected to indicator 42.

Figure 3:
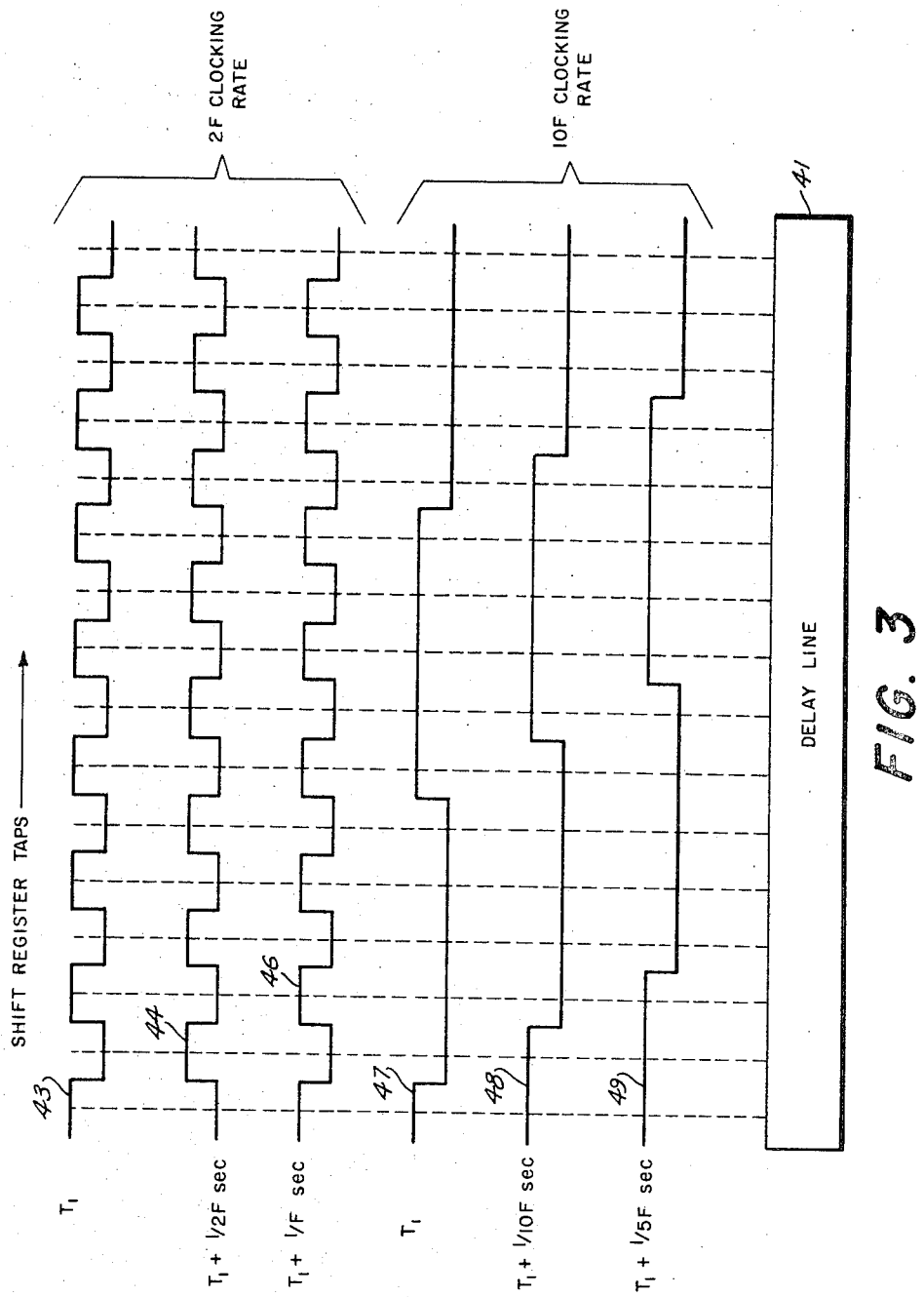
FIG. 3 shows a diagram showing various waveforms in particular time sequences and their relationship to delay line input taps at given times.

Referring to FIG. 3, waveform 43 is shown at time $t_1$ waveform 44 at a time $t_1$ plus $\frac{1}{2}f$ sec., and waveform 46 is shown at time $t_1$ plus $1f$ sec. Waveform 47 is shown at time $t_1$, waveform 48 at time $t_1$ plus $\frac{1}{10}f$ sec., and waveform 49 is shown at time $t_1$ plus $\frac{1}{5}f$ sec. Waveforms 43, 44 and 46 represent a 2f clocking rate (twice the frequency of signal oscillator 31 of FIG. 2). Waveforms 47, 48 and 49 represent a clocking rate of 10f (ten times the frequency of signal oscillator 31 in FIG. 2). These waveforms are shown as they would fill up and appear at a frozen instant within shift register 33, the dotted lines showing their inputs to the various delay taps on delay line 41.

OPERATION

Referring back to FIG. 1, it can be seen that if a sound wave impinges on hydrophones 11 through N from the top of the diagram, it will be received at all hydrophones at the same time, resulting in no phase shift between the various signals induced in hydrophones 11 through N. Hence, in all of the signals induced in hydrophones 11 through N were connected together, the signals would add arithmetically with not attenuation due to phase differences. However, as the azimuth of sound wave impingement varies from normal to the plane of the hydrophone array, a relative phase difference will be present since the sound wave will be striking some hydrophones ahead of others. This would result in attenuation due to relative phase shift of the signals induced in the hydrophones if the outputs were merely connected together. To compensate for this phase difference, the relative shift is theoretically computed from the speed of sound in water and spacing between hydrophones and this shift is then cancelled out by coupling the outputs of the hydrophones into adjacent taps of tapped incremental delay lines 21 through 26. Each delay line then will have a specific delay built into it for compensating for a specific amount of phase shift which in turn compensates for a particular angle of impingement of a sound wave on the hydrophones. When this delay compensates for the phase shift, the various signals will add arithmetically in phase as they pass down the delay lines to the output taps and to the contacts of switch 27. Switch arm 28 of switch 27 then selects a particular delay which in turn is responsive to a particular azimuth and in this manner the sector of interest can be scanned. The switch arm 28 of switch 27 is connected to an indicator 29 which can be any standard or conventional sonar type indicator. Obviously, this system can be utilized equally well in radar applications.

The individual delay lines must have several properties for optimum operation. Among them, of course, are impedence, bandwidth, and delay parameters. It becomes necessary to test the delay lines for a particular azimuth indication by simulating field conditions as closely as possible in the laboratory. This is accomplished by the method and apparatus illustrated in FIG. 2. Here, a signal oscillator 31 at the same frequency of operation as a given delay line is designed to operate, is clipped in clipper 32 and coupled into shift register 33. Shift register 33 has the same number of individual stages as there are incremental taps in the delay line under test, and an output is taken from each stage, filtered in filters 38 and coupled through impedance matching amplifiers 39 to each successive individual delay line tap. A variable shift pulse generator 34 is coupled to the shift pulse line 36 for supplying a clock pulse or shift pulse to shift pulse register 33. Again, it can be seen that if the frequency of the shift pulse generator 34 were infinite, all of the stages of shift pulse register 33 would have the same signal at all times, which in turn would be coupled through filters 38, amplified in amplifiers 39, and coupled as inputs to the taps of delay line 41. In this case there would be no phase shift or difference between the adjacent signal inputs and this condition would simulate the sound wave normal to the array of FIG. 1, which would induce signals in hydrophones 11 through N in phase, and further would require no delay but merely a connecting or direct summation of all of the output signals. Since shift pulse generator 34 cannot have an infinite frequency nor could shift pulse register 33 react to an infinite shift frequency, the equipment limitations are slightly on each side of a relative bearing of zero degrees. In practice it was found that 70 kilocycle shift frequency would carry the simulated phase shift delay to that of a signal impinging up to 358° and from 2° on with a reversal of delay line connections. Hence, at a shift pulse frequency of 70 kilocycles, only 4° are lost, 2° on each side of zero. Shift pulse generator 34 is then varied in frequency and an output is taken from delay line 41 and indicator 42. When the indication of indicator 42 is a maximum, the shift pulse frequency is inducing the correct simulated phase shift in the input signals to delay line 31. From the shift pulse frequency, the phase delay can easily be computed and from that the simulated azimuth can be further computed. In this regard, it is pointed out that a scale on the shift pulse generator could be calibrated directly in degrees. Counter 37 is for the purpose of an additional monitor on the frequency of shift pulse generator 34. Filters 38 change a digital signal into an approximate sine wave for more perfect simulation.

Referring to FIG. 3, the signals which appears in the shift register at various frequencies of shift pulse generator 34 are shown as waveforms 43 through 49. The dotted lines connecting to the delay line 41 indicate the coupling of the waveforms from the individual stages of shift pulse register 33 into the individual taps of delay line 41. It can be seen that if the clocking rate or the shift pulse generator is twice that of the frequency of signal oscillator 31 as shown by curves 43, 44 and 46, each stage will be 180° out of phase with its adjacent stage resulting in a simulated phase shift of a wave appearing at a maximum deviation from normal or zero degrees. This maximum bearing of which the equipment can simulate will depend upon the frequency of operation of the sonar or radar equipment. It can be seen then at time $t_1$ the first, third, fifth, seventh, ninth, etc., stages of shift pulse register 33 will have a one signal and each adjacent stage will have a zero signal. At time $t_1$ plus ½f sec. later the phase will reverse, and at time $t_1$ plus 1f sec. later the phase is again the same as at time $t_1$.

However, if a clocking rate at ten times the signal oscillator frequency is used the waveform will appear to be stretched out as shown by waveforms 47, 48 and 49 and groups of five adjacent stages will all have the same signal. This will approach closer to the condition where they would all have the same signal and there would be no relative phase shift at all. The times $t_1$ plus 1/10f sec. and times $t_1$ plus ⅕f sec. are shown indicating how the signal appears at various instants of time.

It should be understood, of course, that the foregoing disclosure relates to only a preferred embodiment of the invention and that it is intended to cover all changes and modifications of the examples of the invention herein chosen for the purposes of the disclosure which do not constitute departures from the spirit and scope of the invention.

Obviously many codifications and variations of the present invention are possible in the light of the above teachings. It is therefore to be understood that within the scope of the appended claims the invention may be practiced otherwise than as specifically described.

What is claimed is:
1. Apparatus for determining the phase response of a multi-tap delay line to be used in an electronic beam forming transducer array comprising;
   a multi-tap delay line to be tested having at least one output,
   a shift register having a clock input, a signal input, and a plurality of stages equal in number to the number of taps on said multi-tap delay line,
   said register being arranged to sequentially shift any signal present at its signal input through its said plurality of stages at a rate determined by the frequency of its clock input,
   a clock oscillator having a variable clocking frequency connected to said register clock input for supplying said register with a variable frequency clocking signal, a source of alternating signal connected to said register signal input, said alternating signal having a frequency substantially equal to the frequency at which said delay line being tested is designed to operate, a plurality of means for coupling each of said plurality of register stages to respective ones of said equal plurality of delay line taps, means connected to said delay line output for monitoring the maximum level of any signals at said delay line output, whereby said clock frequency may be varied and said means for monitoring will indicate the clock frequency at which a maximum output level occurs.

2. The apparatus of claim 1 wherein each of said plurality of means for coupling comprises;

a signal wave-shaping filter and an amplifier.

References Cited
UNITED STATES PATENTS

| | | | |
|---|---|---|---|
| 2,913,179 | 11/1959 | Gordon | 235—150.52 X |
| 3,006,550 | 10/1961 | Johnson et al. | 235—165 |
| 3,046,545 | 7/1962 | Westerfield | 235—181 X |
| 3,174,032 | 3/1965 | White | 235—181 |
| 3,185,957 | 5/1965 | Ikard et al. | 235—181 X |
| 3,211,899 | 10/1965 | Shreve | 235—181 |
| 3,270,188 | 8/1966 | Ares | 235—181 |

MALCOLM A. MORRISON, *Primary Examiner.*

I. KESCHNER, *Assistant Examiner.*